D. STUART & L. BRIDGE.
Base Burning Fire Place Stove.
No. 4,009. Reissued May 31, 1870.
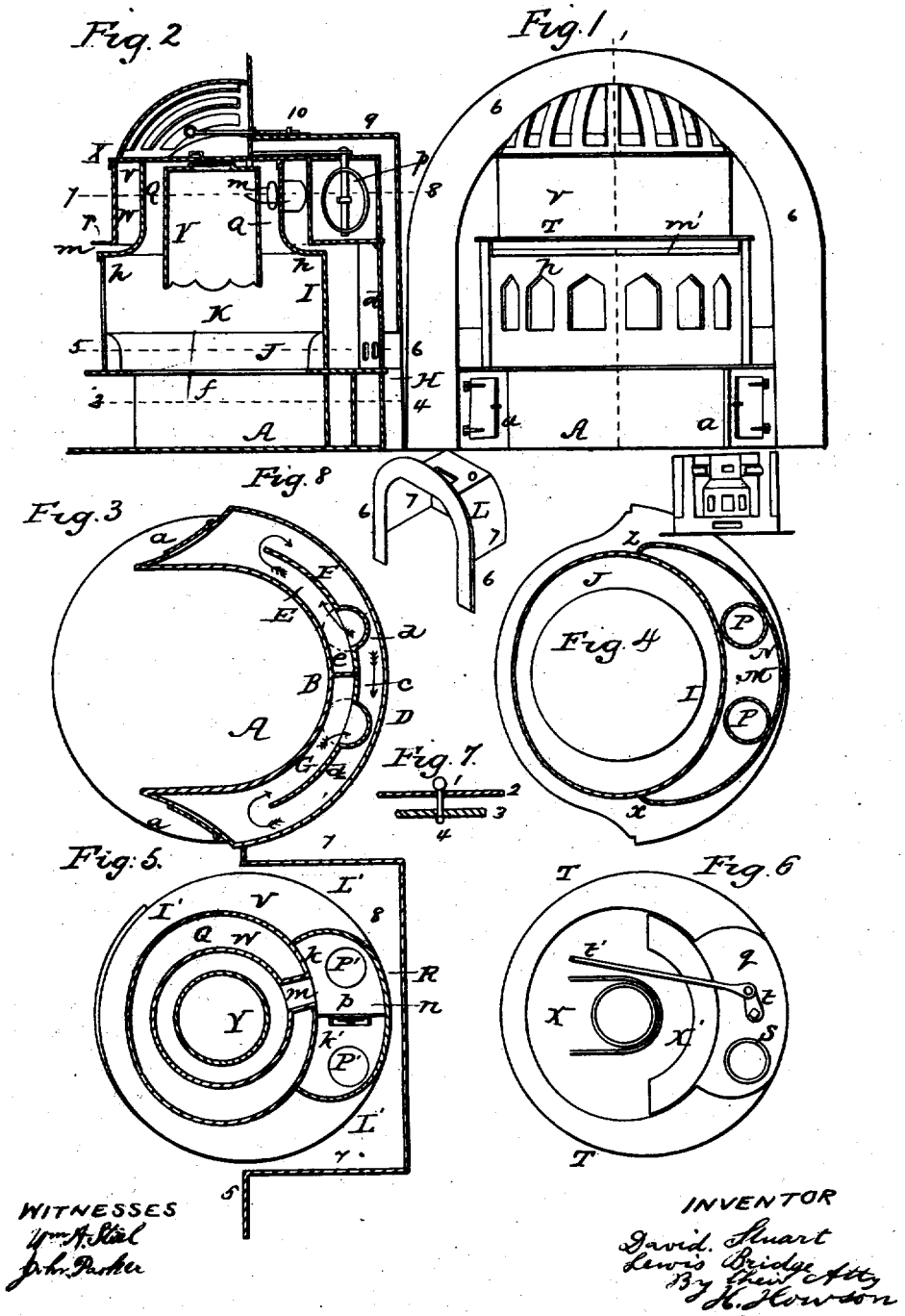
WITNESSES
Wm. A. Steel
John Parker
INVENTOR
David Stuart
Lewis Bridge
By their Atty
H. Howson
N. PETERS, Photo-Lithographer, Washington, D.C.

United States Patent Office.

DAVID STUART AND RICHARD PETERSON, OF PHILADELPHIA, PENNSYLVANIA, ASSIGNEES OF DAVID STUART AND LEWIS BRIDGE.

*Letters Patent No.* 79,275, *dated June* 23, 1868; *reissue No.* 4,009, *dated May* 31, 1870.

DIVISION B.

IMPROVEMENT IN SCREENS FOR BASE-BURNING FIRE-PLACE HEATERS.

The Schedule referred to in these Letters Patent and making part of the same.

*To all whom it may concern:*

Be it known that Letters Patent for DAVID STUART and LEWIS BRIDGE'S Improvements in Base-Burning Fire-Place Stoves were, on June 23, 1868, granted to STUART, PETERSON & Co., of Philadelphia, Pennsylvania, of which firm we, the undersigned DAVID STUART and RICHARD PETERSON are the sole members; and we do hereby declare the following to be a full, clear, and exact description of that part of the said invention which consists of the combination, substantially as described hereafter, of a screen or screens, with a top-feeding, fire-place, base-burning stove, so that the said sceen or screens can be moved to one side, when access has to be had to the fuel-reservoir or feeder, or closed, so as to conceal the reservoir, the screen having openings for the distribution of heated air into the room.

In order to enable others skilled in the art to make and apply our invention, we will now proceed to describe its construction and operation, reference being had to the accompanying drawing, which forms a part of this specification, and in which—

Figure 1 is a front view of the improved fire-place stove;

Figure 2, a vertical section on the line 1–2, fig. 1;

Figure 3, a sectional plan on the line 3–4, fig. 2;

Figure 4, a sectional plan on the line 5–6, fig. 2;

Figure 5, a sectional plan on the line 7–8, fig. 2;

Figure 6, a top view of the stove;

Figure 7, a view of the covers of the feeder;

Figure 8, a perspective view of the casing to fit in the fire-place, and receive the stove; and Figure 9, a diagram, showing a front view of a fire-place stove of the ordinary construction.

A is the oval base-plate of the stove, and to this base are fitted the curved plates B, C, and D, the plates B and D being connected together at their ends by plates *a a*, in each of which is an opening provided with a sliding door.

The plate C is shorter than the other curved plates, and has two semicircular projections, *d d'*, between which is a partition, *e*, extending across the space between the plates B and C.

A plate, H, is fitted to the upper edges of the plates B, C, D, and *a a*, and on this plate rests the oval casing I, inclosing the fire-chamber K, fire-pot J, and grate *f*.

At the rear of the oval casing I is a curved plate, M, secured to the said casing at *x x*, so as to form the crescent-shaped air-chamber N, in which are two pipes, P and P', the former communicating with the interior of the semicircular projection *d*, and the latter with the semicircular projection *d'*, above referred to. This plate M is so perforated as to admit a plentiful supply of cold air to the chamber N.

To the upper edge of the casing I is fitted the horizontal flange *h* of the casing Q, which is contained within the exterior casing V, the latter being fitted to a plate, T, which rests on the curved plate M, but is so far above the flange *h* of the casing Q as to leave a space, *m'*, for the admission of air to the space W, between the casings Q and V.

At the rear of the casing V is a curved plate, R, which, with the said casing, incloses a space separated by a partition, *n*, into two compartments *k* and *k'*, with the former of which the fire-chamber communicates through a tube, *m*.

The partition *n*, between the two compartments, has an opening, provided with a throttle-valve, *p*, the spindle of which passes through a cover-plate, *q*, and is provided with an arm, *t*, to be operated by a rod, *t'*, fig. 6.

In this cover-plate is an opening, S, to which is fitted a pipe, for conveying the products of combustion from the compartment *k'* to the chimney.

It should be stated here that the pipe P communicates with the compartment *k* and the pipe P' with the compartment *k'*, (see fig. 5.)

A plate, Z, is fitted to the upper edges of the casings V and Q, this plate being of the form represented in fig. 6, so as to leave an opening, X', through which the air heated in the chamber W, between the casings Q and V, can escape.

From the plate X is suspended the fuel-reservoir or feeder Y, which terminates below in the fire-chamber, this feeder having at the top an opening for the admission of fuel, which is passed through an opening in the plate X above.

The cover consists of two disks 2 and 3, the former being larger in diameter than the latter, and resting on the plate X, while the disk 3 rests on the top of the feeder, below the said plate. The two disks are connected together by a central pin, 4, so that each disk will be certain to rest on its proper bearing.

The products of combustion can pass between these two covers, that is, between the top of the feeder and under side of the plate X, thus imparting heat, which would be lost, if the feeder extended to the plate X, and a single cover only were used.

In fig. 5 the line 5 represents the face of a wall or chimney-piece, against which bears the arched plate 6, figs. 1 and 8, and to the rear of this plate is secured a casing, L, composed of the side plates 7 7 and rear plate 8, the side plates meeting the top plate 9, which is made flat, as shown in the perspective view, fig. 8.

This casing is fitted into the chimney-place L', which is made in the wall 5, and which is the recess into which the stove projects.

Through the top 9 of this casing projects the pipe

P′, for conveying the products of combustion to the flue of the chimney, and in the top of the plate 9, immediately above the opening X′, fig. 6, is an opening provided with a suitable damper, which may be so adjusted that the heated air can pass upward into the passage which conveys the heated air to the rooms above that in which the stove is situated, or the damper may be so closed that the heated air will be projected outward into the room containing the stove.

Although we have described fully the several parts which relate to the internal arrangement of the stove, it will not be necessary to give here a further explanation of the operation and duties of these parts, as they are fully described in Division A of this application for a reissue of the aforesaid patent of STUART, PETERSON & Co., dated June 23, 1868. We will therefore proceed to describe those features to which this division of the said application more especially relates.

On the top of that portion of the stove which projects into the room is a plate or screen, H′, which, in the present instance, is made in the form of a section of a hollow sphere.

This plate bears with one edge against the face of the wall or chimney-piece, and rests with its lower edge on the top X of the stove, and thus effectually conceals the cover of the feeder and the handle for operating the damper 10, while it serves to distribute the heated air into the room.

The screen, however, is so hinged to the stove, either in one or two parts, that, when access to the handle or feeder becomes necessary, the said screen can be moved on one side.

We claim as the invention of the said STUART and BRIDGE, and desire to secure by Letters Patent—

The combination, substantially as described, with a top-feeding, base-burning, fire-place stove, of a screen or screens, attached to, but movable on the stove.

In testimony whereof we have signed our names to this specification before two subscribing witnesses.

DAVID STUART.
RICHARD PETERSON.

Witnesses:
A. H. PERKINPINE,
JOHN P. CONNELLY.